AUTOMATIC TELEPHONE SYSTEMS

Original Filed Jan. 31, 1952 3 Sheets-Sheet 1

INVENTORS
ALEXANDER ALBERT CHUBB
MAURICE MOISE LEVY
BY
[signature]
ATTORNEY

AUTOMATIC TELEPHONE SYSTEMS

Original Filed Jan. 31, 1952 3 Sheets-Sheet 2

INVENTORS
ALEXANDER ALBERT CHUBB
MAURICE MOISE LEVY
BY Eugene Feinbloom
ATTORNEY

AUTOMATIC TELEPHONE SYSTEMS

Original Filed Jan. 31, 1952 3 Sheets-Sheet 3

INVENTORS
ALEXANDER ALBERT CHUBB
MAURICE MOISE LEVY
BY
ATTORNEY

United States Patent Office

Re. 24,679

Reissued Aug. 11, 1959

24,679

AUTOMATIC TELEPHONE SYSTEMS

Alexander Albert Chubb, Macclesfield, England, and Maurice Moise Levy, Ottawa, Ontario, Canada, assignors to The General Electric Company Limited, London, England Original No. 2,747,019, dated May 22, 1956, Serial No. 269,158, January 31, 1952. Application for reissue October 29, 1958, Serial No. 770,888

Claims priority, application Great Britain February 2, 1951

2 Claims. (Cl. 179—18)

Matter enclosed in heavy brackets [ ] appears in the original patent but forms no part of this reissue specification; matter printed in italics indicates the additions made by reissue.

The present invention relates to automatic switching apparatus for use in automatic exchanges in which a plurality of communication channels is provided by means of a plurality of time interlaced pulse trains, and, in operation, when establishing communication between two stations connected to the exchange, apparatus associated with a first station selects a free one of the channels, a signal is transmitted to automatic switching apparatus associated with the second station identifying the selected free channel, and the said automatic switching apparatus serves to connect the second station to the identified free channel. Such automatic exchanges will be referred to hereinafter as "automatic exchanges of the kind specified" and examples of such exchanges are disclosed in co-pending United States patent applications Nos. 247,072, filed September 18, 1951, 257,786, filed November 23, 1951, and 257,991 and 257,992 filed November 24, 1951.

The object of the present invention is to provide suitable automatic switching apparatus for use in an automatic exchange of the kind specified to connect the said second station to the channel identified by the channel identifying signal.

According to the present invention automatic switching apparatus for use in an automatic exchange of the kind specified to connect the said second station to the channel identified by the channel identifying signal, comprises two or more gate devices, one of the gate devices being for transmitting messages from the first station to the second station, and the other gate device being for transmitting messages from the second station to the first station, selector means responsive to the channel identifying signal to select gating pulses in the selected free channel, and connections for applying the gating pulses to the said gate devices whereby communication between the two stations can be established in the selected channel through the two gate devices.

One arrangement in accordance with the invention will now be described by way of example with reference to the accompanying drawings in which Figure 1 is a block schematic diagram of an automatic telephone exchange of the kind specified embodying automatic switching apparatus according to the present invention.

Figure 1:
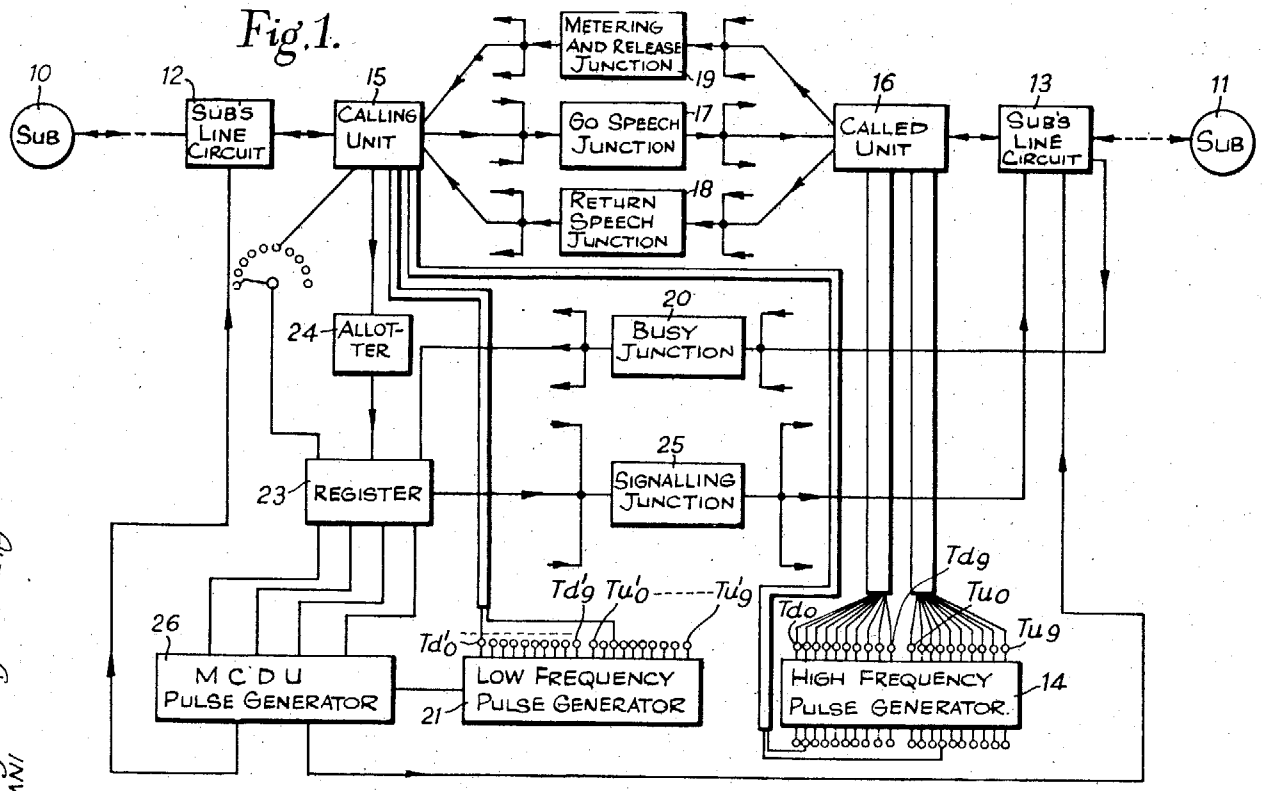
Figure 1 is a block schematic diagram of an automatic telephone exchange which is fully described in the specification of co-pending United States patent application No. 257,786. This exchange will not therefore be fully described in the present specification.

The telephone exchange shown in Figure 1 is suitable for use with 2000 subscribers. Of the 2000 subscribers stations connected to the exchange, one is shown at 10 and another at 11, the station 10 being terminated in the exchange at "subscribers line circuit" 12 and the station 11 being terminated at the "subscribers line circuit 13."

The exchange comprises a group of 100 pulse communication channels the pulses in each channel having a recurrence frequency of about 8,000 P.P.S. This group of channels is provided by means including a pulse generator 14 adapted to generate pulses suitable for combination to provide the 100 channels time-interlaced at the pulse repetition frequency of 8,000 P.P.S. in each channel. The 100 channels are terminated by 100 "calling units" respectively of which one is shown at 15. 100 "called units" terminate the other ends of the channels respectively when in use, one of the "called units" being shown at 16. Messages between the calling and called units pass through a "GO speech junction" 17, a "return speech junction" 18 or a "metering and release junction" 19 as the case may be. In the event of a called subscriber being engaged a "busy signal" is transmitted to the calling subscriber by way of a "busy junction" 20.

For use in establishing calls between subscribers a number of allotters 24 and registers 23 are provided together with a signalling junction 25 and two further pulse generators 21 and 26.

Assuming the subscriber at the station 10 to be calling the subscriber at the station 11 the first operation occurs in the subscribers line circuit 12. This contains a finder which finds a free calling unit 15. An allotter 24 then comes into operation and allots a register 23 to the calling unit 15.

By means of the allotter and a finder in the register the calling unit found by the subscribers line circuit 12 is connected to the allotted register 23. A dialling tone is then automatically transmitted to the calling subscriber.

The output of the pulse generator 21 is in the form of a recurring sequence of 20 pulses which for convenience will be divided into groups of ten each. The first ten pulses in each sequence will be referred to collectively as the d′ pulses and the second ten as the u′ pulses. The ten d′ pulses will be referred to individually as the pulses $d'_0$ to $d'_9$ respectively and appear at the terminals $Td'_0$ to $Td'_9$ respectively of the generator 21. The ten u′ pulses will be referred to individually as pulses $u'_0$ to $u'_9$ and appear at the terminals $Tu'_0$ to $Tu'_9$ respectively of the generator 21.

Each of the calling units 15 is connected to one of the terminals $Td'_0$ to $Td'_9$ and to one of the terminals $Tu'_0$ to $Tu'_9$ of the generator 21, different ones of the calling units being connected to different pairs of the terminals Td′ and Tu′. Thus each calling unit is identified by a different pair of d′ and u′ pulses and, as will be described later, the pair of d′ and u′ pulses identifying the calling unit, and hence the selected channel, is transmitted to the called subscriber's line circuit to identify the high grade channel on which communication is to be established.

When the calling subscriber hears the dialling tone and dials the number of the called subscriber, the dialling pulses are transmitted through the line circuit 12 and the seized calling unit 15 to the allotted register 23. In the register the four sets of dialling pulses are stored on four uniselectors. Four groups of ten pulses each, which will be referred to as the M, C, D and U pulses are applied to the four uniselectors in the register from the pulse generator 26. Thus the uniselectors in the register select one pulse from each of the four groups of recurring pulses applied thereto and it is arranged that these four selected pulses are combined to form a recurring output pulse which occurs in one recurring channel interval in a recurring sequence of 2,000 channel intervals. The sequence may recur for example at the rate of one per second and the 2,000 channels constitute a group of low grade signalling channels.

The recurring output pulse from the register is used as a gate pulse and permits the recurring pair of d′, u′ pulses identified with the seized calling unit to pass to a signalling junction 25 only in the low grade channel interval determined by the gating pulse.

The output from the signalling junction is applied to all subscriber's line circuits. These circuits have gating pulses applied thereto however from the pulse generator 26, the gating pulses applied to each subscriber's line circuit being in the channel whose number corresponds to the subscriber's number on the exchange. Thus the only subscriber's line circuit to respond to a pair of d′, u′ pulses appearing at the output of the signalling junction is that one whose gating pulse corresponds to the number dialled.

The called subscriber's line circuit then hunts for a free called unit and when a free called unit is found this unit functions to select appropriate pulses from the output of the generator 14 to enable the called subscribed to establish communication in the channel terminated by the seized calling unit. The called unit forms the subject of the present invention and one embodiment thereof will now be described in more detail with reference to Figures 2 and 3.

Figure 2:
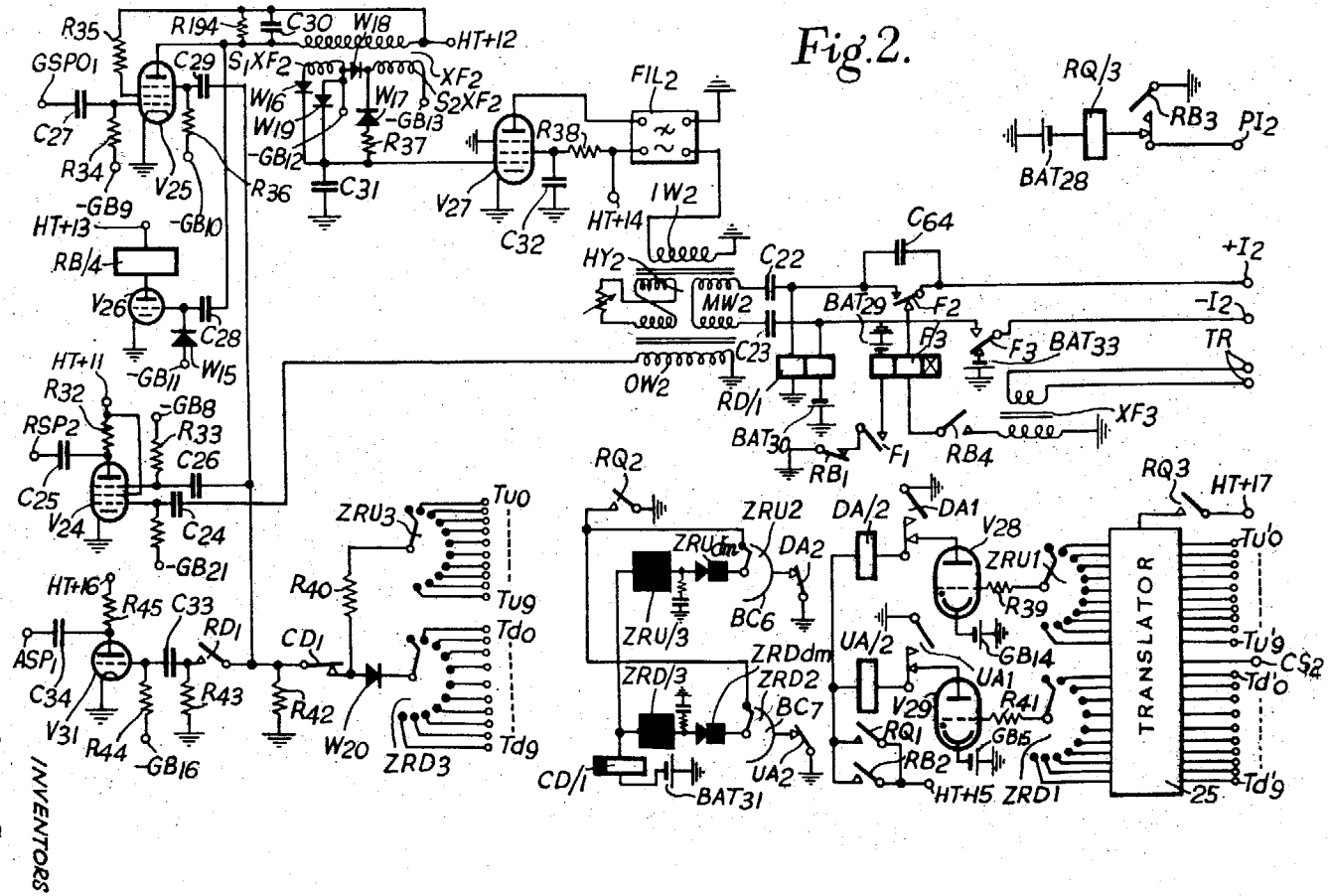
Figure 2 is a circuit diagram of one embodiment of the invention suitable for use in the automatic exchange of Figure 1.

In Figure 2 a control terminal $PI_2$ is connected through relay contacts RB3, a relay winding RQ and a battery $BAT_{28}$ to earth. The terminal $PI_2$ is connected to one fixed contact of a control bank of a uniselector forming part of the finder in the called subscriber's line circuit. The wiper of this bank is normally earthed. Two terminals $+I_2$ and $-I_2$ are connected through relay contacts $F_2$ and $F_3$ respectively and capacitors $C_{22}$ and $C_{23}$ to a winding $MW_2$ of a hybrid transformer $HY_2$. An output winding $OW_2$ of the transformer $HY_2$ has one terminal earthed and the other terminal thereof is connected through a capacitor $C_{24}$ to the control grid of a pentode valve $V_{24}$ whose cathode is earthed. The anode of the valve $V_{24}$ is connected through a load resistor $R_{32}$ to the positive terminal HT+11 of a source (not shown) of D.C. whose negative terminal is earthed. The anode is also connected through a capacitor $C_{25}$ to an output terminal $RSP_2$ which is connected to the "return speech junction" 18 of Figure 1. The screen grid is connected directly to the terminal HT+11. Negative bias is applied to the control grid of the valve $V_{24}$ from a bias terminal $-GB_{21}$. The suppressor grid is connected through a capacitor $C_{26}$ to relay contacts CD1 and through a resistor $R_{33}$ to the negative terminal $-GB_8$ of a bias source (not shown).

An input terminal $GSPO_1$ which is connected to the output of the "GO speech junction" 17 of Figure 1 is connected through a capacitor $C_{27}$ to the control grid of a pentode valve $V_{25}$ whose cathode is earthed. The control grid of the pentode $V_{25}$ is also connected through a resistor $R_{34}$ to the negative terminal $-GB_9$ of a bias source (not shown) whose positive terminal is earthed. The anode of the pentode $V_{25}$ is connected through the primary winding of a transformer $XF_2$ to the positive terminal HT+12 of a source (not shown) of D.C. whose negative terminal is earthed. The anode is also connected through a capacitor $C_{28}$ to the control grid of a triode valve $V_{26}$ whose cathode is earthed. The anode of the triode $V_{26}$ is connected through a relay winding RB to the positive terminal HT+13 of a source (not shown) of D.C. whose negative terminal is earthed. The control grid of the triode $V_{26}$ is connected through a rectifier $W_{15}$ to the negative terminal $-GB_{11}$ of a bias source whose positive terminal is earthed. The screen grid of the pentode $V_{25}$ is connected through a resistor $R_{35}$ to the positive terminal HT+12. The suppressor grid is connected through a resistor $R_{36}$ to the negative terminal $-GB_{10}$ of a bias source (not shown) whose positive terminal is earthed, and through a capacitor $C_{29}$ to the relay contacts CD1.

The transformer $XF_2$ has two secondary windings $S_1XF_2$ and $S_2XF_2$. One terminal of the winding $S_1XF_2$ is connected to the negative terminal $-GB_{12}$ of a bias source (not shown) whose positive terminal is earthed, and the other terminal thereof is connected through a rectifier $W_{16}$ to the control grid of a pentode valve $V_{27}$ whose cathode is earthed. One terminal of the winding $S_2XF_2$ is connected to the negative terminal $-GB_{13}$ of a bias source (not shown) whose positive terminal is earthed, and the other terminal of the winding $S_2XF_2$ is connected through a rectifier $W_{17}$, and a resistor $R_{37}$ to the control grid of the pentode $V_{27}$.

A rectifier $W_{18}$ is connected between the terminal $-GB_{12}$ and the left-hand terminal of the winding $S_2XF_2$ in the drawing.

The primary winding of the transformer $XF_2$ is tuned by a capacitor $C_{30}$ which is shunted by a resistor R194.

The anode of the pentode $V_{27}$ is connected through the input circuit of a low-pass filter $FIL_2$ to the positive terminal HT+14 of a source (not shown) of D.C. whose negative terminal is earthed. The screen grid of the pentode $V_{27}$ is connected through a resistor $R_{38}$ to the positive terminal HT+14 and is decoupled by a capacitor $C_{32}$. One output terminal of the low-pass filter $FIL_2$ is connected to earth and the other output terminal is connected through the winding $IW_2$ of the hybrid transformer $HY_2$ to earth.

The terminal $-I_2$ is normally connected to earth through the relay contacts F3 and a battery $BAT_{33}$, and the terminal $+I_2$ is normally connected through the relay contacts F2 and through one winding of a relay F to the moving contact of relay contacts RB4. These contacts are normally open and the fixed contact thereof is connected through the secondary winding of a transformer $XF_3$ to earth. The primary winding of the transformer $XF_3$ is connected to terminals TR to which ringing current is applied from a suitable source (not shown). The contacts F2 are bridged by a capacitor $C_{64}$. One terminal of the other winding of relay F is connected through a battery $BAT_{29}$ to earth and the other terminal thereof is connected through relay contacts F1 and RB1 to earth. One winding of a relay RD is connected between the right-hand plate (in the drawing) of the capacitor $C_{22}$ and earth. The other winding of the relay RD has one terminal connected to the right-hand plate of the capacitor $C_{23}$ and has the other terminal connected through a battery $BAT_{30}$ to earth.

A uniselector ZRU has three banks ZRU1, ZRU2 and ZRU3, each of which has a home contact and bank contacts. The bank ZRU1 has ten banks contacts which are connected to the translator 25 to be described later. The wiper of the bank ZRU1 is connected through a resistor $R_{39}$ to the control grid of a gas-filled triode valve $V_{28}$. The cathode of the valve $V_{28}$ is connected to the negative terminal of a bias source $GB_{14}$ whose positive terminal is earthed. The anode of the valve $V_{28}$ is connected through relay contacts DA1 to one terminal of a relay winding DA. The other terminal of the winding DA is connected through relay contacts RQ1 and RB2 in parallel to the positive terminal HT+15 of a source (not shown) of D.C. whose negative terminal is earthed.

The bank ZRU2 is a homing bank and has its homing arc $BC_6$ connected to earth through relay contacts DA2. The wiper of the bank ZRU2 is connected through contacts ZRUdm, operating winding ZRU, a relay winding CD and a battery $BAT_{31}$ in series to earth. The home contact of the bank ZRU2 is connected through relay contacts RQ2 to earth.

The bank ZRU3 has ten bank contacts which are connected to ten terminals $Tu_0$ to $Tu_9$ respectively. The wiper of the bank ZRU3 is connected through a resistor $R_{40}$ to the fixed contact of contacts CD1.

A uniselector ZRD has three banks ZRD1, ZRD2 and ZRD3, each of which has a home contact bank contacts. The bank ZRD1 has ten bank contacts which are connected to the translator 25. The wiper of ZRD1 is connected through a resistor $R_{41}$ to the control grid of a gas-filled triode $V_{29}$ whose cathode is connected to earth through a bias source $GB_{15}$. The anode of the valve $V_{29}$ is connected through relay contacts UA1 to one terminal of a relay winding UA and the other terminal of the winding UA is connected through the relay contacts RQ1 and RB2 to the terminal HT+15.

The bank ZRD2 is a homing bank and the homing arc $BC_7$ is connected through relay contacts $UA_2$ to earth, and the home contact through RQ2 to earth. The wiper of the bank ZRD2 is connected through the mechanically operated contact ZFDdm, the operating winding ZRD, the relay winding CD and the battery $BAT_{31}$ in series to earth.

The bank ZRD3 has ten bank contacts which are connected to ten terminals $Td_0$ to $Td_9$ respectively. The wiper of the bank ZRD3 is connected through a rectifier $W_{20}$ to the fixed contact of contacts CD1.

The moving contact of the contact CD1 in addition to being connected through the capacitors $C_{26}$ and $C_{29}$ to the suppressor grids of the pentodes $V_{24}$ and $V_{25}$ respectively is connected through a resistor $R_{42}$ to earth and directly to the moving contact of contacts RD1. The fixed contact of contacts RD1 is connected through a resistor $R_{43}$ to earth and through a capacitor $C_{33}$ to the control grid of a triode valve $V_{31}$ whose cathode is earthed. Negative bias is applied through a resistor $R_{44}$ to the control grid of the triode $V_{31}$ from the negative terminal $-GB_{16}$ of a bias source (not shown) whose positive terminal is earthed. The anode of the valve $V_{31}$ is connected through a capacitor $C_{34}$ to an output terminal $ASP_1$, and through a resistor $R_{45}$ to the positive terminal HT+16 of a source (not shown) of D.C. whose negative terminal is earthed. The terminal $ASP_1$ is connected to the metering and release junction of Figure 1.

The translator 25 is connected through relay contacts RQ3 to the positive terminal HT+17 of a source (not shown) of D.C. whose negative terminal is earthed. Ten terminals $Tu'_0$ to $Tu'_9$ and ten terminals $Td'_0$ to $Td'_9$ are connected to the translator, and a further terminal $CS_2$ is connected to the called subscriber's line circuit to receive the pairs of d′ u′ pulses passed by the called subscriber's line circuit.

Figure 3:
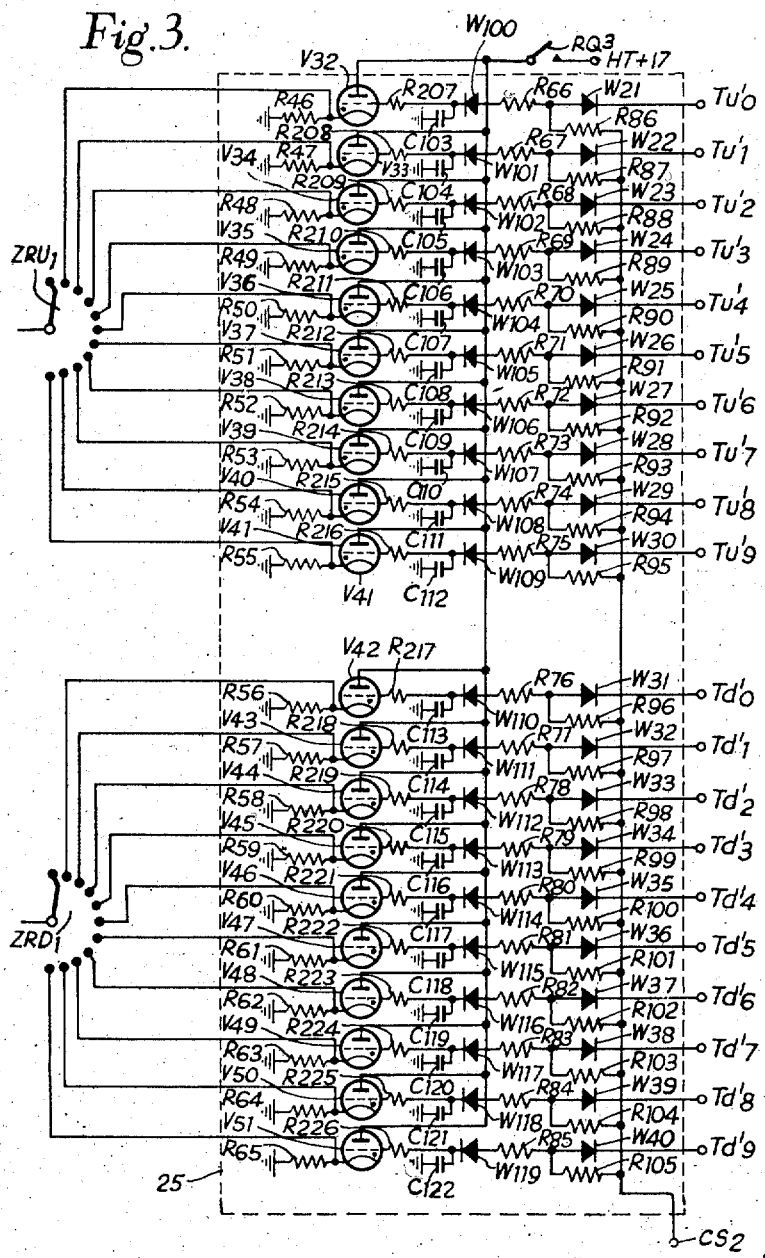
Figure 3 is a circuit diagram of a part shown in block form in Figure 2.

Referring now to Figure 3, this is a theoretical circuit diagram of the translator 25. The translator comprises two groups of gas-filled triode valves each group containing ten valves. A first of the groups contains ten triodes $V_{32}$ to $V_{41}$ whose cathodes are connected to earth through resistors $R_{46}$ and $R_{55}$ respectively, and directly to the ten bank contacts respectively of the uniselector bank ZRU1. The anodes to the triodes $V_{32}$ to $V_{41}$ are connected together and through the relay contacts to RQ3 to the terminal HT+17. The terminals $Tu'_0$ to $Tu'_9$ are connected through ten rectifiers $W_{21}$ to $W_{30}$ ten resistors $R_{66}$ to $R_{75}$ and ten rectifiers $W_{100}$ to $W_{109}$ respectively in series to the control grids of the triodes $V_{32}$ to $V_{41}$. The terminal $CS_2$ is connected through ten resistors $R_{86}$ to $R_{95}$ to the junctions of the rectifiers and resistors connecting the terminals $Tu'_0$ to $Tu'_9$ respectively to the control grids of the triodes $V_{32}$ to $V_{41}$. The control grids of the triodes $V_{32}$ to $V_{41}$ are connected through capacitors $C_{103}$ to $C_{112}$ and resistors $R_{207}$ to $R_{216}$ respectively to earth.

The second group contains ten triodes $V_{42}$ to $V_{51}$ whose cathodes are earthed through resistors $R_{56}$ to $R_{65}$ respectively. The cathodes of these valves are also connected directly to the ten bank contacts respectively of the uniselector bank ZRD1. The anodes of the valves $V_{42}$ to $V_{51}$ are connected together and through the relay contacts RQ3 to the terminal HT+17. The terminals $Td'_0$ to $Td'_9$ are connected through ten rectifiers $W_{31}$ to $W_{40}$ ten resistors $R_{76}$ to $R_{85}$ and ten rectifiers $W_{110}$ to $W_{119}$ respectively in series to the control grids of the valves $V_{42}$ to $V_{51}$. The terminal $CS_2$ is connected through ten resistors $R_{96}$ to $R_{105}$ to the junctions of the rectifiers $W_{31}$ to $W_{40}$ and resistors $R_{76}$ to $R_{85}$ respectively.

In operation the d′ and u′ pulses arriving at the terminal $CS_2$ from the called subscriber's line circuit are applied to the control grids of the valves $V_{32}$ to $V_{51}$ through the resistors $R_{86}$ to $R_{105}$ and pulse lengthening circuits comprising the rectifiers $W_{100}$ to $W_{119}$ and capacitors $C_{103}$ to $C_{122}$. The rectifiers $W_{21}$ to $W_{40}$ are, however, conducting to these pulses except the rectifiers to which d′ and u′ pulses are applied from the terminals $Tu'_0$ to $Td'_9$ simultaneously with the d′ and u′ pulses arriving at the terminal $CS_2$. In this example it will be assumed that the pulses $d'_0$ and $u'_1$ appear at the terminal $CS_2$ simultaneously with the pulses $d'_0$ and $u'_1$ applied at the terminals $Td'_0$ and $Tu'_1$. Thus the rectifiers $W_{31}$ and $W_{22}$ are non-conducting in this example and permit the $d'_0$ and $u'_1$ pulses applied to the terminal $CS_2$ to pass to the control grids of the valves $V_{42}$ and $V_{33}$ respectively. These two valves strike and hence their cathodes become positive.

When the wiper of the bank ZRU1 reaches the bank contact connected to the cathode of the valve $V_{33}$ the positive potential appears at the control grid of the valve $V_{28}$ (Figure 2) and this valve strikes. Similarly the valve $V_{29}$ (Figure 2) strikes when the wiper of the bank ZRD1 reaches the bank contact connected to the cathode of the valve $V_{42}$.

Referring to Figure 2, when the valves $V_{28}$ and $V_{29}$ strike the relays DA and UA become energised by the anode circuits of these two valves. Thus the contacts DA1, DA2, UA1 and UA2 are operated. The contacts DA1 and hold the relay DA and extinguish the valve $V_{28}$ and the contacts DA2 break the automatic stepping circuit of the uniselector ZRU. The contacts UA1 hold the relay UA and extinguish the valve $V_{29}$, and the contacts UA2 break the automatic stepping circuit of the uniselector ZRD.

Thus the wipers of the banks ZRD3 and ZRU3 are arrested on the bank contacts connected to the terminals $Td_0$ and $Tu_1$ respectively. The pulses $d_0$ and $u_1$ are applied to these terminals respectively from the high frequency pulse generator. In the absence of a $d_0$ pulse the rectifier $W_{20}$ is conducting and hence the $u_1$ pulses are dropped across the resistor $R_{40}$. The occurrence of a $d_0$ pulse renders the rectifier $W_{20}$ non-conducting and hence the $u_1$ pulse occurring during each $d_0$ pulse passes to the contacts CD1 that is to say pulses in channel No. 1. These contacts close simultaneously with the opening of the automatic stepping circuit of the selectors and the pulses in channel No. 1 pass to the suppressor grids of the valves $V_{24}$ and $V_{25}$.

Thus unmodulated pulses of anode current flow in the valves $V_{24}$ and $V_{25}$ which are arranged to be normally non-conducting by the bias applied thereto from the terminals $-GB_8$ and $-GB_{10}$ respectively. The pulses passed by the valve $V_{25}$ are applied through the capacitor $C_{28}$ to the control grid of the valve $V_{26}$. Thus, pulses of anode curent flow in this valve which is arranged to be normally non-conducting by the bias applied thereto from the terminal $-GB_{11}$. Thus the relay RB becomes energised and the contacts RB1 and RB4 thereof are operated.

The contacts RB3 put an earth on the terminal $PI_2$. The contacts RB2 close and hold the relays DA and UA when the relay RQ becomes de-energised on the operation of the contacts RB3.

The contacts RB4 close and apply ringing voltage from the transformer $XF_3$ to the called subscriber's station via the terminals $+I_2$ and $-I_2$. When the called subscriber answers the relay F becomes energised, the energising circuit being from earth through the battery $BAT_{33}$ the contacts F3, the called subscriber's line, the contacts F2, the relay winding F, the contacts RB4 and the secondary winding of the transformer $XF_3$ back to earth. The contacts RB1 and F1 hold the relay F.

The relay RD then becomes energised, the energising circuit being from earth through the battery $BAT_{30}$, one winding of the relay RD, the contacts F3, the called subscriber's line the contacts F2 and the other winding of the relay RD back to earth.

The contacts RD1 then apply the pulses in channel No. 1 through the valve $V_{31}$ to the terminal $ASP_1$ and thence through the metering and release junction (19, Fig. 1) to the calling unit 15.

All pulses from the terminal $GSPO_1$ are passed to the control grid of the pentode $V_{25}$ which is gated by channel No. 1 pulses as previously described. Thus only the pulses in channel No. 1 pass to the transformer $XF_2$.

The primary winding is tuned by the capacitor $C_{30}$ to a periodicity of approximately twice the width of the pulses applied thereto from the valve $V_{25}$, and is heavily damped by the resistor $R_{194}$. The winding $S_2XF_2$ has more turns than the winding $S_2XF_1$ and hence provides a greater output voltage than $S_2XF_1$.

The terminal $-GB_{13}$ is arranged to be about five volts less negative than the terminal $-GB_{12}$.

Assuming the charge in the capacitor $C_{31}$ to be such that the potential of the upper plate thereof in the drawing is between that of $-GB_{13}$ and $-GB_{12}$, the rectifiers $W_{16}$ to $W_{19}$ are non-conducting. When a pulse arrives at the primary winding of the transformer $XF_2$ from the valve $V_{25}$ the leading edge of the pulse shock excites the transformer. The first, and negative, half-cycle of the free oscillation is applied to the anode of $W_{16}$ which, therefore, remains non-conducting, and to the cathode of $W_{17}$ which becomes conducting and hence $C_{31}$ discharges through $R_{37}$ and $W_{17}$ until the potential of its upper plate in the drawing equals the potential of the terminal $-GB_{12}$. Any further negative excursion at the cathode of $W_{17}$ is damped by $W_{18}$. Simultaneously $W_{19}$ becomes conducting and as a result the capacitor $C_{31}$ discharges further and its upper plate is left at a potential somewhat below that of the terminal $-GB_{12}$.

Just as this negative half-cycle ends, the lagging edge of the pulse arrives and again the transformer $XF_2$ is shock-excited but this time in the opposite sense. The first, and positive, half-cycle of this second free oscillation has no effect on $W_{17}$ and $W_{18}$. The capacitor $C_{31}$ is charged, however, through $W_{16}$ to a value dependent upon the amplitude of the pulse applied to the transformer $XF_2$, and lying between the potentials of the terminals $-GB_{12}$ and $-GB_{13}$.

The damping provided by the resistor $R_{194}$ is arranged to be sufficient to prevent subsequent half-cycles from affecting the charge in the capacitor $C_{31}$.

Thus the capacitor $C_{31}$ presents relatively broad pulses to the valve $V_{27}$ in response to relatively narrow pulses passed by the valve $V_{25}$, the amplitude of the broad pulses being dependent upon the amplitude of the narrow pulses.

The broad amplitude-modulated pulses are demodulated by being pressed through the low-pass filter $FIL_2$ and the speech voltages are passed through the transformer $HY_2$, the capacitors $C_{22}$ and $C_{23}$, the contacts F2 and F3, and the called subscriber's line circuit to the called subscriber's line.

Speech voltages from the called subscriber are passed through his line circuit, and the hybrid transformer $HY_2$ to the control grid of the pentode valve $V_{24}$. Here they serve to amplitude-modulate the pulses (in channel No. 1) applied from the anode of $V_{24}$ to the terminal $RSP_2$. These pulses are applied through the Return speech junction to the calling unit.

When a call is ended and the calling subscriber replaces his handset on its rest it is arranged that the calling unit is released and hence pulses arriving at the terminal $GSPO_1$ of Figure 2 cease and the relay RB becomes deenergised. The contacts RB1 reopen and release the relay F. The contacts RB2 open and release the relays DA and UA. Thus the contacts DA2 and UA2 close and the uniselectors ZRU and ZRD home. The called unit is then ready for use in making another call.

Although an arrangement has been described in which two pulses (d′, u′) are transmitted to the called unit in other systems a different number of pulses may be transmitted. For example where more than 100 channels are provided it will be necessary to transmit three pulses, one of which is representative of the 100's the second of the 10's and the third of the units in the selected channel number. A further group of ten tubes is then added in Figure 3 and appropriate gating pulses applied thereto. Likewise a further uniselector is added in Figure 2 and controlled by the tubes in the third group in Figure 3.

We claim:

[1. In combination, a selector device having a plurality of input terminals, an output terminal and selector means for selectively connecting the input terminals to said output terminal, means to apply pulse trains of different phases to said input terminals respectively, a control circuit to actuate said selector means, a source of control voltage connected to said control circuit to cause said selector means to select one of said input terminals for connection to said output terminal, a pulse demodulator, a pulse modulator and means to connect said output terminal to said demodulator and modulator.]

[2. In combination, a selector device having a plurality of input terminals, an output terminal and selector means for selectively connecting the input terminals to said output terminal, means to apply pulse trains having different channel identifying signals to said input terminals respectively, a control circuit to actuate said selector means, a source of control voltage connected to said control circuit to cause said selector means to select one of said input terminals for connection to said output terminal, a pulse demodulator, a pulse modulator and means to connect said output terminal to said demodulator and modulator.]

[3. A combination as set forth in claim 2 wherein each channel identifying signal includes a pulse whose instant of occurrence identifies a different pulse train, and wherein the selector means comprises a group of gas filled electron discharge tubes each of which has an anode, a cathode and a control electrode, a plurality of gate devices in the control electrode circuits of the several discharge tubes respectively, means for causing said gate devices to open in turn, and circuit means for applying a selected one of said channel identifying signals to the control electrodes of all said discharge tubes through said gate devices whereby the pulse of said selected channel identifying signal passes to the control electrode of only one of said discharge tubes to strike said tube and identify a selected pulse train.]

[4. In combination, a selector device having a plurality of input terminals, an output terminal and selector means for selectively connecting the input terminals to said output terminal, means to apply pulse trains of different phases to said input terminals respectively, a control circuit to actuate said selector means, a source of control signals connected to said control circuit to cause said selector means to select one of said input terminals for connection to said output terminal, a pulse demodulator, a pulse modulator, and means to connect said output terminal to said demodulator and modulator.]

[5. A combination as set forth in claim 4, wherein each control signal includes a pulse, the instants of occurrence of pulses in different ones of said control signals identifying different ones of said pulse trains, and wherein the selector means comprises a group of gas-filled electron discharge tubes each having an anode, a cathode, and a control electrode, a plurality of gate devices in the control electrode circuits of the discharge tubes respectively, means for causing said gate devices to open in turn, and circuit means for applying a selected one of said control signals to all said gate devices whereby the pulse of the selected control signal passes to the control electrode of only one of said discharge tubes to strike said tube and identify one of the said pulse trains to be selected.]

*6. In combination, a selector device having a plurality of input terminals, an output terminal and selector means for selectively connecting the input terminals to said output terminal, means to apply pulse trains having different channel identifying signals to said input terminals respectively, a control circuit to actuate said selector means, a source of control voltage connected to said control circuit to cause said selector means to select one of said input terminals for connection to said output terminal, a pulse demodulator, a pulse modulator and means to connect said output terminal to said demodulator and modulator, each channel identifying signal including a pulse whose instant of occurrence identifies a different pulse train, the selector means comprising a group of gas filled electron discharge tubes each of which has an anode, a cathode and a control electrode, a plurality of gate devices in the control electrode circuits of the several discharge tubes respectively, means for causing said gate devices to open in turn, and circuit means for applying a selected one of said channel identifying signals to the control electrodes of all said discharge tubes through said gate devices whereby the pulse of the said selected channel identifying signal passes to the control electrode of only one of said discharge tubes to strike said tube and identify a selected pulse train.*

*7. In combination, a selector device having a plurality of input terminals, an output terminal and selector means for selectively connecting the input terminals to said output terminal, means to apply pulse trains of different phases to said input terminals respectively, a control circuit to actuate said selector means, a source of control signals connected to said control circuit to cause said selector means to select one of said input terminals for connection to said output terminal, a pulse demodulator, a pulse modulator, and means to connect said output terminal to said demodulator and modulator, each control signal including a pulse, the instants of occurrence of pulses in different ones of said control signals identifying different ones of said pulse trains, the selector means comprising a group of gas filled electron discharge tubes each having an anode, a cathode, and a control electrode, a plurality of gate devices in the control electrode circuits of the discharge tubes respectively, means for causing said gate devices to open in turn, and circuit means for applying a selected one of said control signals to all said gate devices whereby the pulse of the selected control signal passes to the control electrode of only one of said discharge tubes to strike said tube and identify one of the said pulse trains to be selected.*

References Cited in the file of this patent or the original patent

UNITED STATES PATENTS

| | | |
|---|---|---|
| 2,379,715 | Hubbard | July 3, 1945 |
| 2,506,613 | Ransom | May 3, 1950 |
| 2,513,291 | Deloraine et al. | July 4, 1950 |
| 2,570,274 | Ransom | Oct. 9, 1951 |
| 2,583,711 | Scowen | Jan. 29, 1952 |
| 2,616,977 | Staal | Nov. 4, 1952 |
| 2,619,548 | Lesti | Nov. 25, 1952 |
| 2,649,505 | Ransom et al. | Aug. 18, 1953 |
| 2,651,678 | Edwards | Sept. 8, 1953 |
| 2,678,354 | Den Hertog | May 19, 1954 |
| 2,683,771 | Ridlington | July 13, 1954 |